(12) United States Patent
Bonnet (10) Patent No.: US 6,292,710 B1
(45) Date of Patent: Sep. 18, 2001

(54) CONVEYOR HAVING VARIABLE SPEED CONTROL

(75) Inventor: Henri Bonnet, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/467,553

(22) Filed: Dec. 20, 1999

(51) Int. Cl.$^7$ .............................. G06F 7/00; B65G 47/31
(52) U.S. Cl. ..................... 700/230; 198/461.1; 198/577
(58) Field of Search ..................... 700/230; 198/461.1, 198/577

(56) References Cited

U.S. PATENT DOCUMENTS

| | | |
|---|---|---|
| 3,006,452 | 10/1961 | Hill . |
| 3,053,377 | 9/1962 | Strothmann . |
| 3,620,349 | 11/1971 | McComble . |
| 3,799,319 | 3/1974 | Cutler et al. . |
| 3,822,009 | 7/1974 | Richards . |
| 4,629,058 * | 12/1986 | Reissmann et al. ............. 198/577 X |
| 4,762,219 | 8/1988 | Walters et al. . |
| 4,765,456 | 8/1988 | Bower . |
| 4,792,033 | 12/1988 | Iwata et al. . |
| 4,865,179 | 9/1989 | Carter et al. . |
| 5,170,877 | 12/1992 | Francioni . |
| 5,228,558 * | 7/1993 | Hall .................................. 198/577 X |
| 5,318,167 * | 6/1994 | Bronson et al. ..................... 198/577 |
| 5,570,773 | 11/1996 | Bonnet . |
| 5,711,410 * | 1/1998 | Cai et al. ..................... 198/461.1 X |
| 5,738,202 * | 4/1998 | Ydoate et al. ................ 198/461.1 X |

* cited by examiner

Primary Examiner—Christopher P. Ellis
Assistant Examiner—Gene O. Crawford
(74) Attorney, Agent, or Firm—Alston & Bird LLP

(57) ABSTRACT

An apparatus and method for using same relates generally to automated conveying and sorting of items such as packages from one or more loading sites to a variety of output destinations, and more particularly relates to a conveying system which can eject packages to either side of a conveyor path onto designated output chutes, bins or subsequent conveyors under a particular means of control. This control provides a means for speeding up the sorting conveyor when there is no unloading or loading occurring. The main sorting conveyor can be sped up for more rapid loading when the time interval before discharging the next article is within a predetermined range.

22 Claims, 10 Drawing Sheets

FIG. 2.

SCENARIO 1

FIG. 6A.
INITIALLY
P1,P2 INTRODUCED

FIG. 6B.
3 SEGMENTS LATER
P2 DISCHARGED

FIG. 6C.
2 SEGMENTS LATER
P1 DISCHARGED

SCENARIO 2

FIG. 7A.
INITIALLY
P1,P2 INTRODUCED

FIG. 7B.
3 SEGMENTS LATER
P1 DISCHARGED

FIG. 7C.
4 SEGMENTS LATER
P2 DISCHARGED

SCENARIO 3

FIG. 8A.
INITIALLY
P1, P2 INTRODUCED

SCENARIO 3

FIG. 8B.
5 STATIONS LATER

SCENARIO 4

FIG. 9A.
INITIALLY
P1 AND P2
INTRODUCED

FIG. 9B.
3 SEGMENTS LATER
P3 INTRODUCED

FIG. 9C.
2 SEGMENTS LATER
P1, P2 DISCHARGED

FIG. 10.

CONVEYOR HAVING VARIABLE SPEED CONTROL

TECHNICAL FIELD

This invention relates generally to automated conveying and sorting of items such as packages from one or more loading sites to a variety of output destinations, and more particularly relates to a conveying system which can eject packages to either side of a conveyor path onto designated output chutes, bins or subsequent conveyors under programmed or manual control, which is efficient in its use of "idle time".

BACKGROUND OF THE INVENTION

Modern high volume package delivery systems often include package conveying systems that accept packages from one or more loading stations, and transport the packages to a variety of output destinations such as chutes, bins, and subsequent conveyor systems.

One of the most conventional types of conveyors is a belt conveyor, which includes the use of an endless flexible belt which passes over at least two cylindrical rollers, one of which is a drive roller. Packages are placed atop the upwardly-directed "working" surface of the belt conveyor, and are transported in a generally straight direction from end of the conveyor to the other. Another type of conveyor is a "roller" conveyor which con include powered or idling rollers which contact, support, and in certain instances propel the bottom of the package along its path.

Such prior art conveying systems tend to have a substantially fixed capacity which is a function of their operating speed. This translates to a certain number of cells or trays or linear feet of belt which pass a reference point. The higher the number the higher the capacity.

However, the effect of inertia limits conveyor speeds; the faster the conveyor speeds the more likely inertia will negatively affect discharge accuracy. At very high speed reliable control of the packages is very difficult due to the effect of inertia. A desired property of any automated system is operation accuracy which is very difficult to achieve at high constant speed. System mistakes are bound to be very costly to a user since it can lead to mis-deliveries of parcels which must be rectified at the carrier's expense.

Various prior art methods and apparatuses have been developed to convey items.

U.S. Pat. No. 3,799,319 to Cutler et al. discloses an article-aligning apparatus having a variable speed feed conveyor for providing articles to trays of a main sorting conveyor. The articles are aligned on the trays once they are placed on the sorting conveyor.

U.S. Pat. No. 4,765,456 to Bower discloses a variable speed belt conveyor with a drive system designed to share the load at any speed of operation.

U.S. Pat. No. 5,170,877 to Francioni discloses an automatic conveyor system. The conveyor system includes a main conveyor system and a plurality of branch conveyors. If a stoppage is detected at one of the branch conveyors and articles begin to accumulate on the other branch conveyors, the other branch conveyors begin to operate at a faster speed. The speed of advance of conveyor portion of a branch conveyor is varied in order to prevent overcrowding of articles on the conveyor.

U.S. Pat. No. 4,792,033 to Iwata et al. discloses an apparatus for supplying articles to a conveyor. The speed of the conveyor is varied so that articles are uniformly spaced on the conveyor. The conveyor speed is increased to produce space on the conveyor sufficient to receive a predetermined number of additional articles.

Therefore it may be seen that variable speed sorting conveyors are known in the art. Furthermore, increasing the capacity of a main sorting conveyor by increasing the speed of input conveyors is known. It is also known to accumulate articles at a particular location for entry onto the main sorting conveyor by varying the speed of a conveyor.

However, a need still exists in the art for an improved sorting conveyor.

SUMMARY OF THE INVENTION

The present invention overcomes deficiencies in the prior art by providing a method and apparatus for providing same for speeding up a sorting conveyor when there is no unloading occurring. The main sorting conveyor can be sped up for more rapid loading when the time interval before discharging the next article is within a predetermined range.

Generally described, the present invention is directed towards a method of transporting a plurality of parcels from one destination from another atop a conveyor having a speed control, the method including determining the time until the next package of the plurality of parcels is to be discharged from the conveyor, the determination establishing a remaining conveying time, comparing the remaining conveying time to a predetermined threshold, and increasing the conveyor transport speed during a portion of the remaining conveying time during which no parcels are discharged.

Therefore it is an object of the present invention to provide an improved conveying apparatus.

It is a further object of the present invention to provide an improved conveying method.

It is a further object of the present invention to provide an improved conveying method and apparatus which provides improved efficiency features.

It is a further object of the present invention to provide an improved conveying method and apparatus which provides improved safety features.

It is a further object of the present invention to provide an improved conveying method and apparatus which provides improved reliability features.

It is a further object of the present invention to provide an improved conveying method and apparatus which provides improved loading features.

It is a further object of the present invention to provide an improved conveying method and apparatus which provides improved discharge features.

It is a further object of the present invention to provide an improved conveying method and apparatus which provides improved transport features.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 5 is a pictorial view of an endless oval-shaped conveyor system 400 as generally shown in U.S. Pat. No. 5,433,311. This configuration 400 includes a plurality of upper tiltable trays 420U, a plurality of lower tiltable trays 420L, upper input stations 410U, lower input stations 410L, upper discharge stations 430U, and lower discharge stations 430L. Reference is made to U.S. Pat. No. 5,433,311 for the specifics of operation of this configuration, but generally described, the configuration 400 defines a generally oval-shaped endless conveying path which allows for parcel loading to the upper tiltable trays 420U via the upper input stations 310U, and parcel unloading therefrom via upper discharge stations 430U. Parcel loading to the lower tiltable trays 420L is done via the lower input stations 410L, and parcel unloading therefrom via lower discharge stations 430L. The trays are allowed to tilt to discharge the parcels.

DETAILED DESCRIPTION OF THE PREFERRED EMBODIMENT

Reference is now made in more detail to the drawings, in which like numerals refer to like parts throughout the several views.

General Recognitions

The inventor has recognized that merely transporting the package between charge and discharge can be done at very high speed without adverse effect on the parcel due to the absence of the manifestation of the interial forces during that time.

The experience of the inventor also has resulted in a recognition that it is easier to charge a system at high speed then to discharge without loss of control on the package.

General Conveyor Operation and Construction

The method according to the present invention is based on the random distribution between all parcels on the system and their respective destinations.

Generally described, the present invention comprises a variable speed control for transporting packages between loading and unloading stations at varying rates of speed. Although the system must run relatively slowly to discharge packages, packages may be loaded at higher rates of speed. If no discharging is in progress, the system may speed up significantly above its normal speed until time for discharging a package. Since the sorting system knows the distance and time until the next package is unloaded, the conveyor may speed up if the smallest time interval before discharge is within a predetermined window of time. Upon approaching the designated unloading station, the conveyor will resort to its normal speed for discharging the package.

Figure 1:
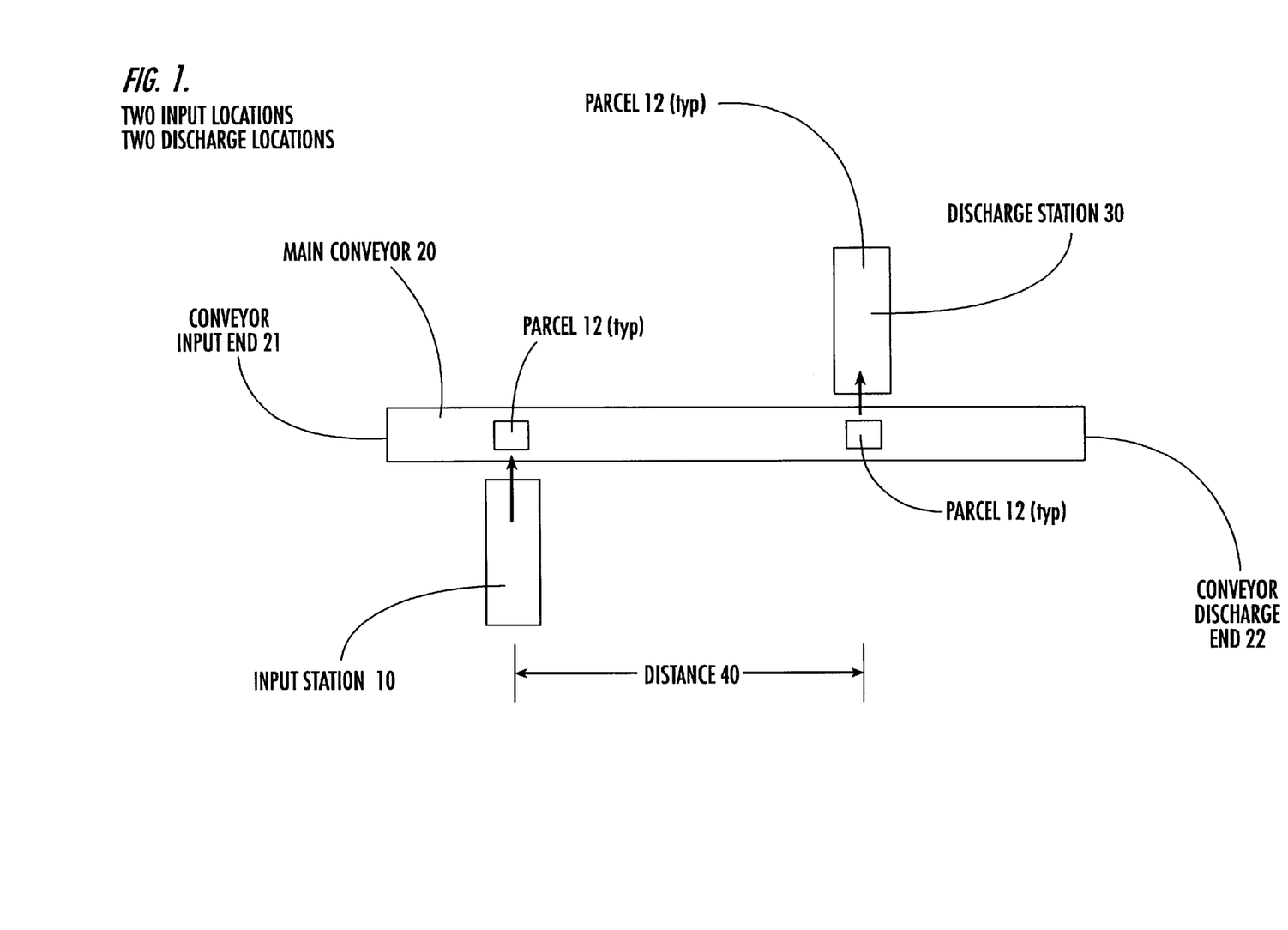
FIG. 1 is a top illustrative view of a simple conveying system including a linear main conveyor 20 (such as a belt conveyor) which is loaded by an input station 10 and is unloaded by a discharge station 30. The input station 10 is a distance 40 along conveyor 20 from the discharge station 30. The main conveyor 20 also includes an input end 21 and a discharge end 22, configured for accepting and discharging parcels, respectively.

Reference is now made to FIG. 1, which is a top illustrative view of a simple conveying system including a linear main conveyor 20 (such as a belt conveyor) which is loaded by an input station 10 and is unloaded by a discharge station 30. The input station 10 is a distance 40 along conveyor 20 from the discharge station 30. The main conveyor 20 includes an input end 21 and a discharge end 22, configured for accepting and discharging parcels such as 12.

It should be understood that a configuration such as shown in FIG. 1 includes two input stations, the input station 10 and the input end 21 of the conveyor 20. The configuration such as shown in FIG. 1 likewise includes two discharge (a.k.a. "output") stations, the discharge station 30 and the discharge end 22 of the conveyor 20.

Figure 2:
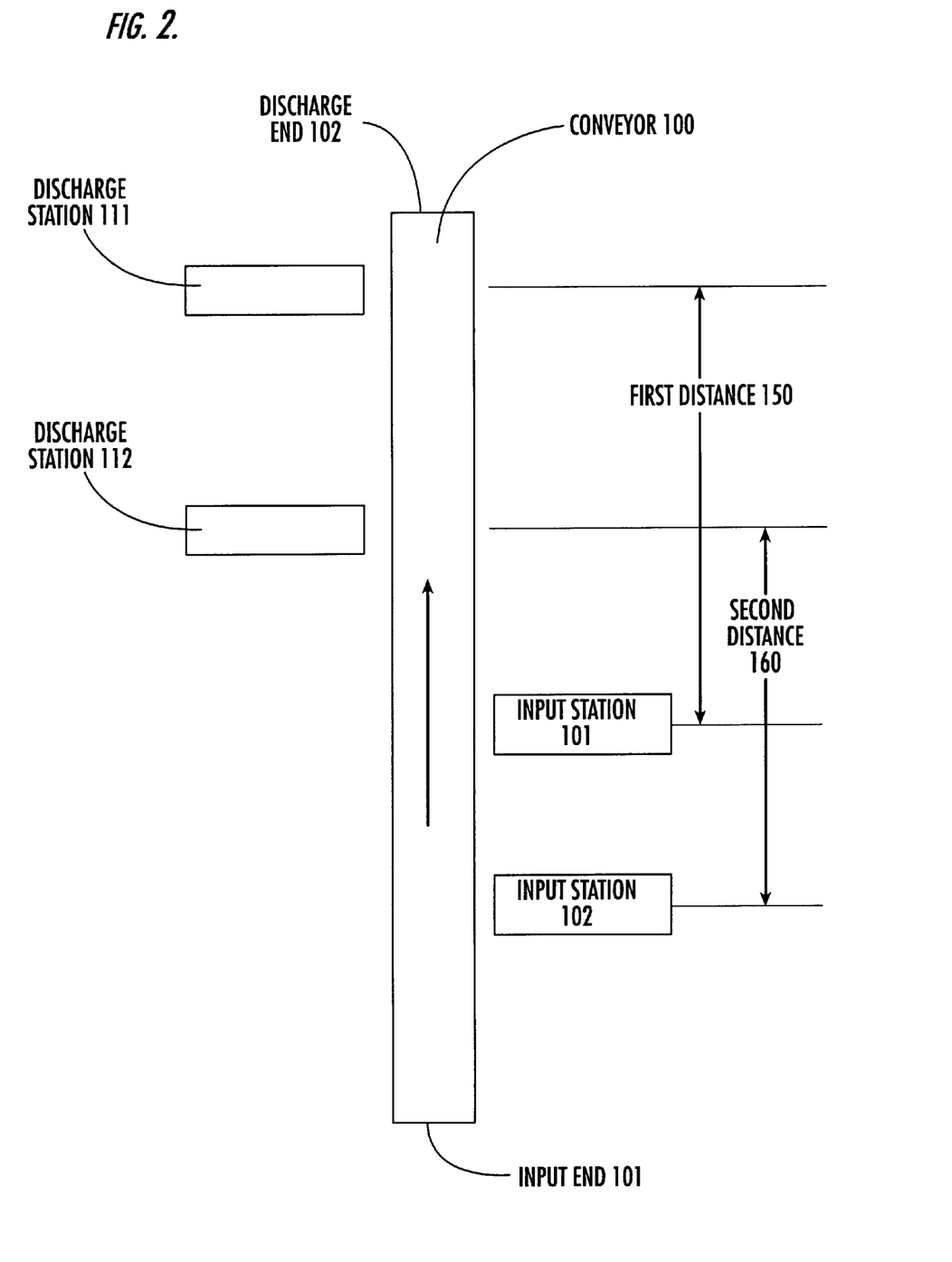
FIG. 2 is a top illustrative view of a second conveying system including a linear main conveyor 100 (such as a belt conveyor) which is loaded by a first input station 101 and a second input station 102, and is unloaded by a first discharge station 111 and a second discharge station 112. The first input station 101 is a first distance 150 along conveyor 100 from the first discharge station 111, and the second input station is a second distance from the second discharge station 112. The linear main conveyor 100 also includes an input end 103 and a discharge end 104.

FIG. 2 is a top illustrative view of a second conveying system including a linear main conveyor 100 (such as a belt conveyor) which is loaded by a first input station 101 and a second input station 102, and is unloaded by a first discharge station 111 and a second discharge station 112. The first input station 101 is a first distance 150 along conveyor 20 from the first discharge station 111, and the second input station is a second distance from the second discharge station 112. The linear main conveyor 100 includes an input end 103 and a discharge end 104.

It should be understood that a configuration such as shown in FIG. 2 includes three input stations, the input stations 101 and 102, and the input end 101 of the conveyor 100. The configuration such as shown in FIG. 2 likewise includes three discharge (a.k.a. "output") stations, such as discharge stations 111, 112 and the discharge end 102 of the conveyor 100.

Figure 3:
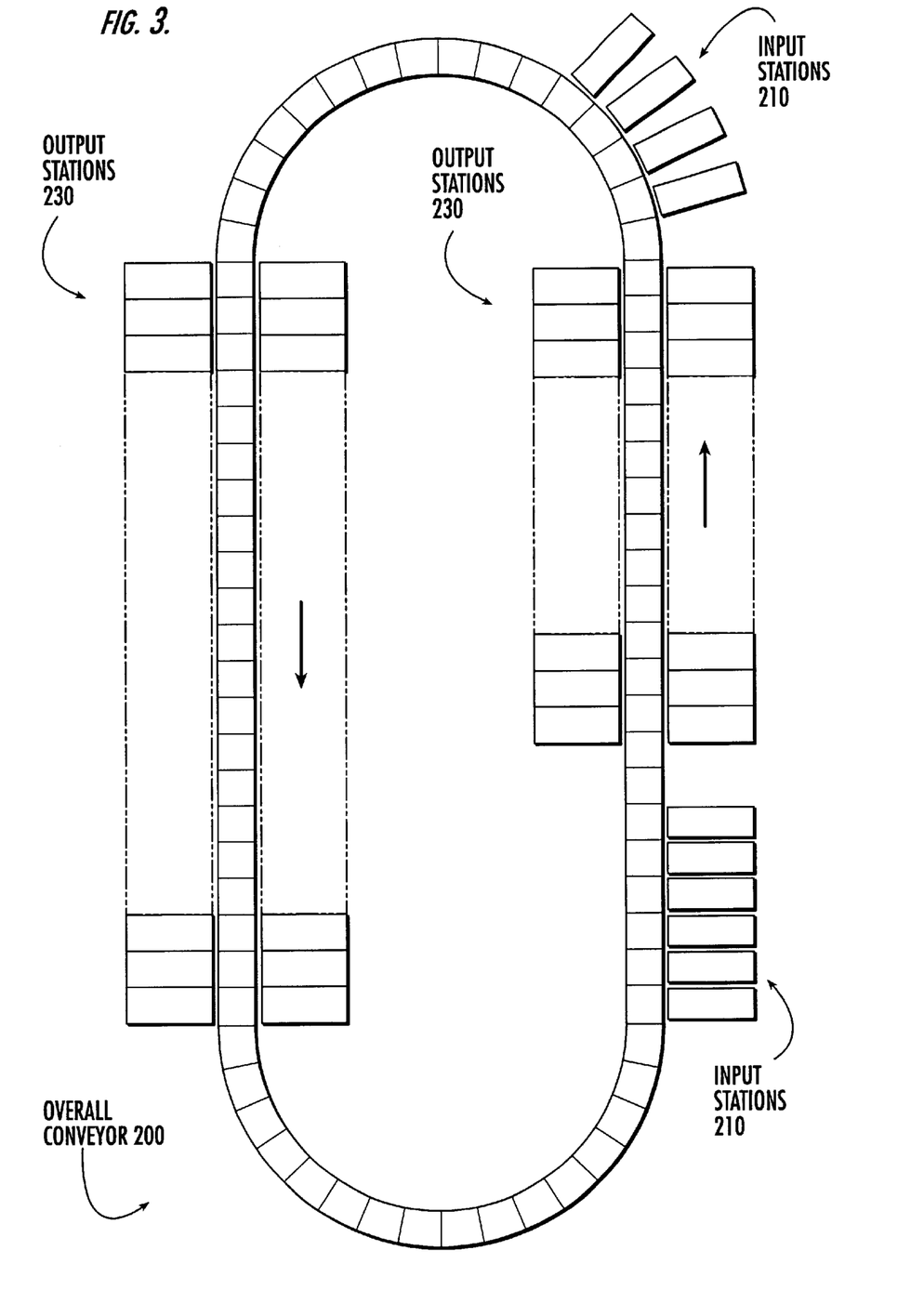
FIG. 3 is a top plan view of an endless oval-shaped conveyor system 200, which includes a plurality of input stations 210 and a plurality of output stations. Such a configuration is generally shown in U.S. Pat. No. 5,433,311, incorporated by reference. The input stations 210 are shown introducing parcels or other items from the outside of the oval-shaped conveying path, although introduction from within the oval-shaped conveying path is contemplated without departing from the spirit and scope of the present invention. Similarly, the output stations are shown receiving parcels or other items from both sides of the oval-shaped conveying path, although introduction from only one side of the oval-shaped conveying path is contemplated without departing from the spirit and scope of the present invention. It should be understood that such an oval-shaped conveying path could be used with a belt conveyor system having side notches as shown in FIG. 4, or could be used with a "tilt-tray" configuration as shown in FIG. 5.
Figure 4:
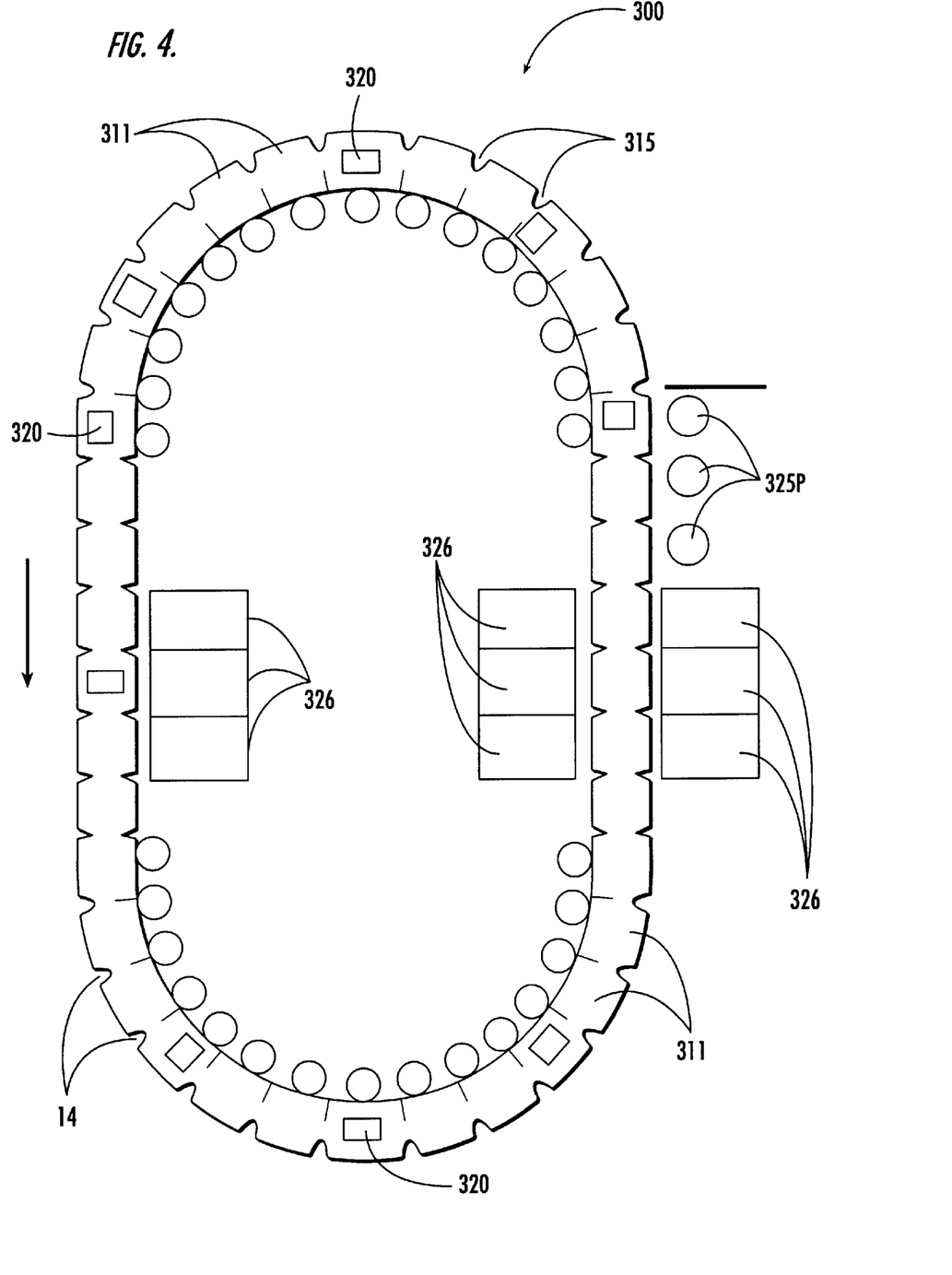
FIG. 4 is a top plan view of a conveyor belt configuration 300 which includes slotted sides to allow for an oval-shaped path as shown in U.S. Pat. No. 5,894,918, incorporated herein by reference, or further can be serpentine-shaped as shown further in U.S. Pat. No. 5,894,918. This configuration 300 includes input stations 325P, output stations 326, a flexible belt conveyor including segments 311, all for transporting parcels 320.
Figure 5:
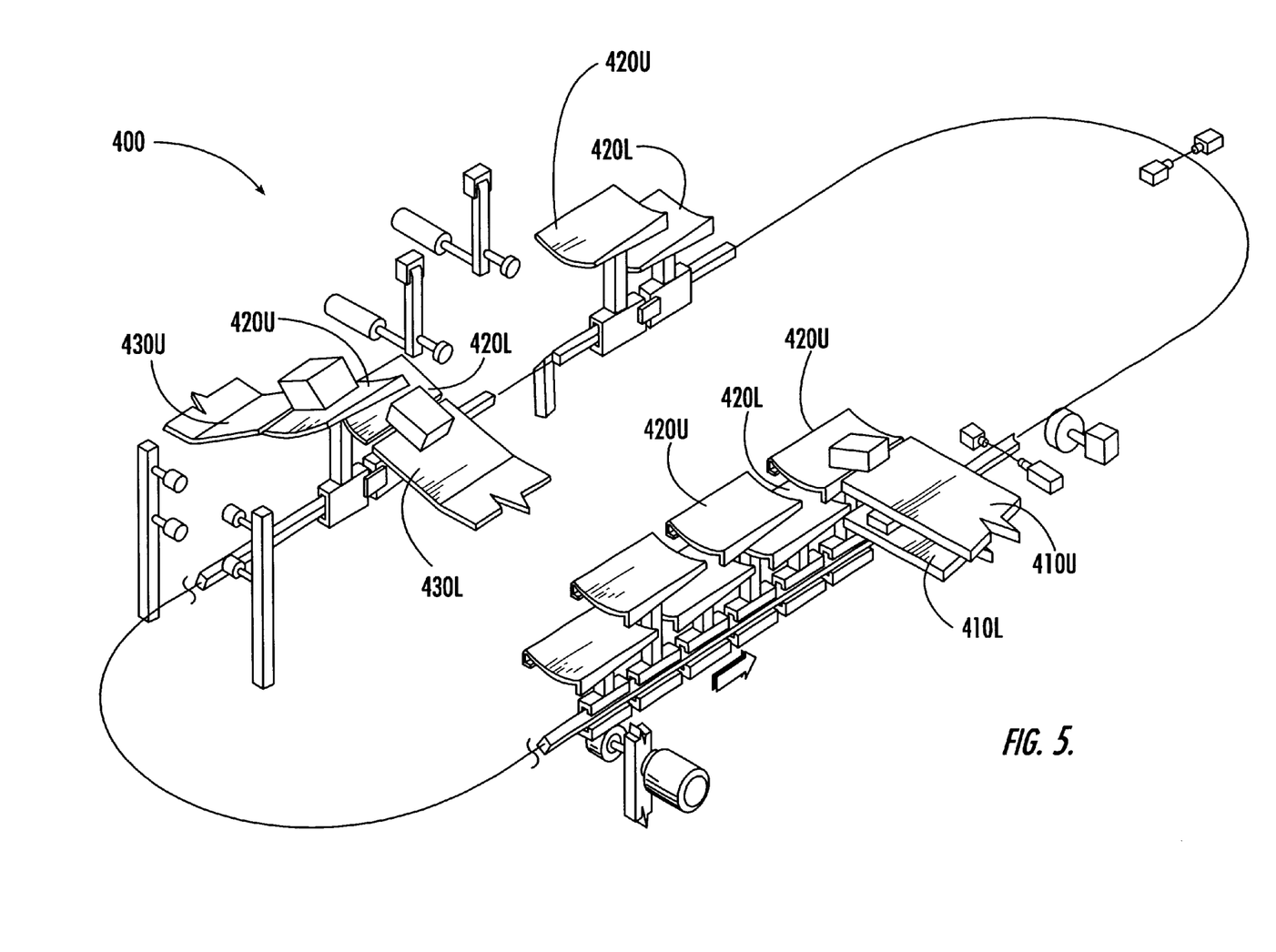

Reference is now briefly made to FIGS. 3–5, which show alternate conveyor layouts which differ from the straight belt conveyor shown in FIGS. 1 and 2.

FIG. 3 is a top plan view of an endless oval-shaped conveyor system 200, which includes a plurality of input stations 210 and a plurality of output stations. Such a configuration is generally shown in U.S. Pat. No. 5,433,311, incorporated by reference. The input stations 210 (which could be input conveyors) are shown introducing parcels or other items from the outside of the oval-shaped conveying path, although introduction from within the oval-shaped conveying path is contemplated without departing from the spirit and scope of the present invention. Similarly, the output stations are shown receiving parcels or other items from both sides of the oval-shaped conveying path, although introduction from only one side of the oval-shaped conveying path is contemplated without departing from the spirit and scope of the present invention. It should be understood that such an oval-shaped conveying path could be used with a belt conveyor system having side notches as shown in FIG. 4, or could be used with a "tilt-tray" configuration as shown in FIG. 5.

FIG. 4 is a top plan view of a conveyor belt configuration 300 which includes slotted sides to allow for a oval-shaped path as shown in U.S. Pat. No. 5,894,918, incorporated herein by reference, or further can be serpentine-shaped as shown further in U.S. Pat. No. 5,894,918. This configuration 300 includes input stations 325P, output stations 326, a flexible belt conveyor including segments 311, all for transporting parcels 320.

FIG. 5 is a pictorial view of an endless oval-shaped conveyor system 400 as generally shown in U.S. Pat. No. 5,433,311. This configuration 400 includes a plurality of upper tiltable trays 420U, a plurality of lower tiltable trays 420L, upper input stations 410U, lower input stations 410L, upper discharge stations 430U, and lower discharge stations 430L. Reference is made to U.S. Pat. No. 5,433,311 for the specifics of operation of this configuration, but generally described the configuration 400 defines a generally oval-shaped endless conveying path which allows for parcel loading to the upper tiltable trays 420U, via the upper input stations 310U, and parcel unloading therefrom via upper discharge stations 430U. Parcel loading to the lower tiltable trays 420L is done via the lower input stations 410L, and parcel unloading therefrom via lower discharge stations 430L. The trays are allowed to tilt to discharge the parcels.

The Idling Threshold Concept

Regardless which of the above conveyor types is being used, at times a loaded system may run for some time without any parcel being discharged. This period can vary between seconds to minutes. During that time the parcels are merely transported by the system on their way to their proper destinations.

The present invention contemplates that during the "idle time", the system be automatically switched to a much higher speed since there is less danger of adverse effect on the discharge.

Several different scenarios will now be discussed. It should be noted that the use of these scenarios should not be construed as limiting but are for purposes of example only.

When describing the following scenarios, a threshold will be assumed. This threshold is as follows: the conveyor must go through a period when all of its parcels idle at the same time through at least three consecutive segments. Another way of describing this is that all parcels on the conveyor must go through at least three consecutive "idle stations" at the same time to meet the threshold.

Although the above threshold is proposed at three consecutive segments, it should be understood that different thresholds may be used, and may differ depending on the type of system in use.

Figure 6A:
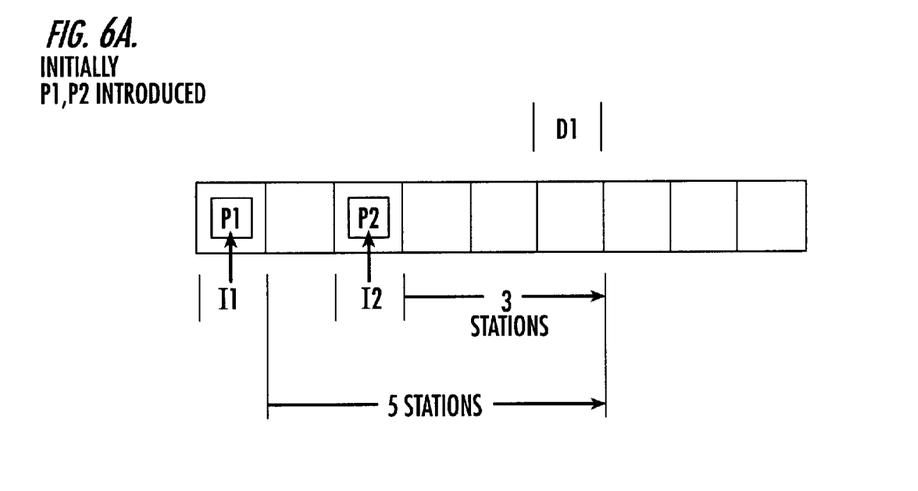
FIGS. 6A–6C are sequential illustrative view of parcels being conveyed under a first conveying scenario.
Figure 6B:
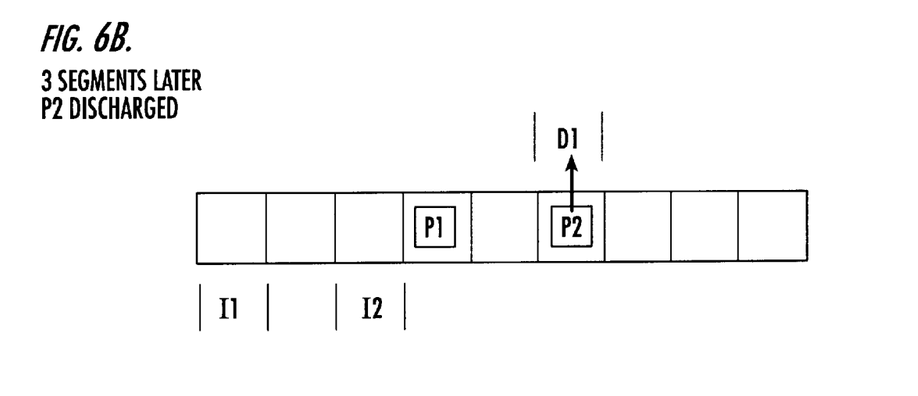
Figure 6C:
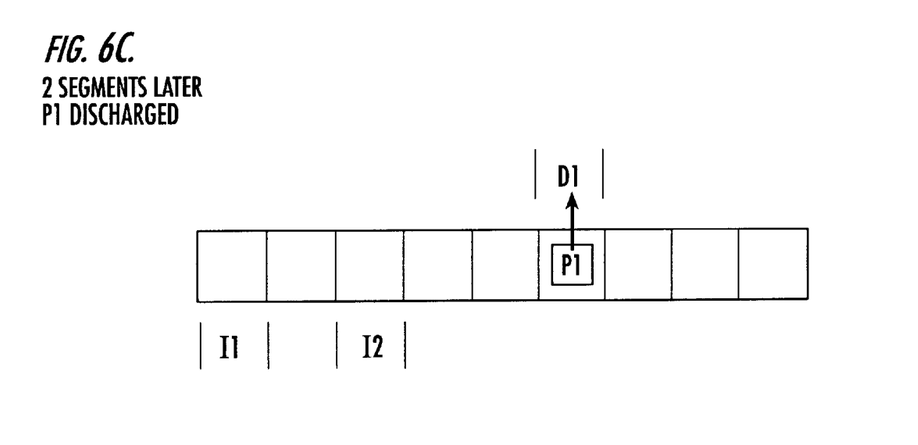

First Scenario (FIGS. 6A–6C)

Under the first scenario, parcels P1 and P2 are input at the same time at locations I1 and I2, respectively, and are both to be discharged at discharge location D1. Under this scenario, parcel P2 is the first to be discharged after "idling" through two distance segments prior to being discharged from the third segment as shown in FIG. 6B. After parcel P2 is discharged, parcel P1 idles through one distance segment, and is then discharged from the last segment to discharge location D1 as shown in FIG. 6C.

Under this scenario, conveyor speed does not change, because the "idling threshold" is not met.(*claim generally) As may be seen, parcel P2 only idles though two consecutive space segments between its discharge and its discharge. Parcel P1 idles through four segments before its discharge, but since parcels P1 and P2 (all the parcels on the conveyor) only idle through two consecutive segments at the same time, the threshold is not met. Thus no speed change is made.

Figures 7A, 7B:
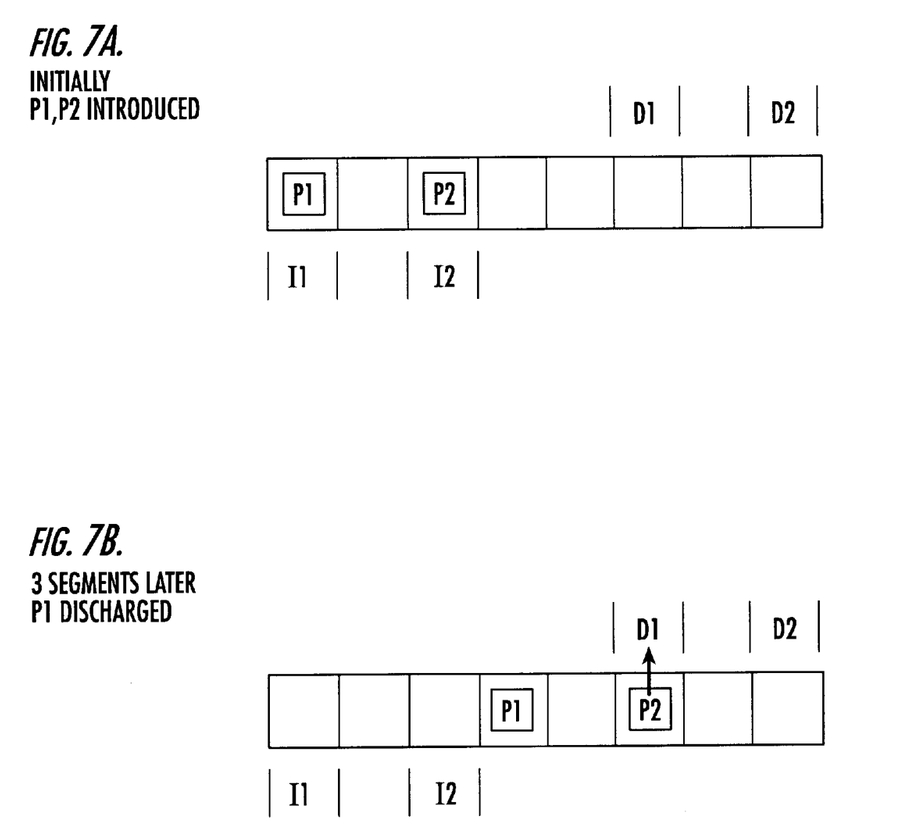
FIGS. 7A–7C are sequential illustrative views of parcels being conveyed under a second conveying scenario.
Figure 7B:
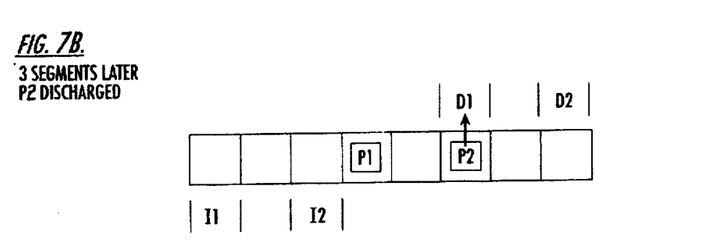
Figure 7C:
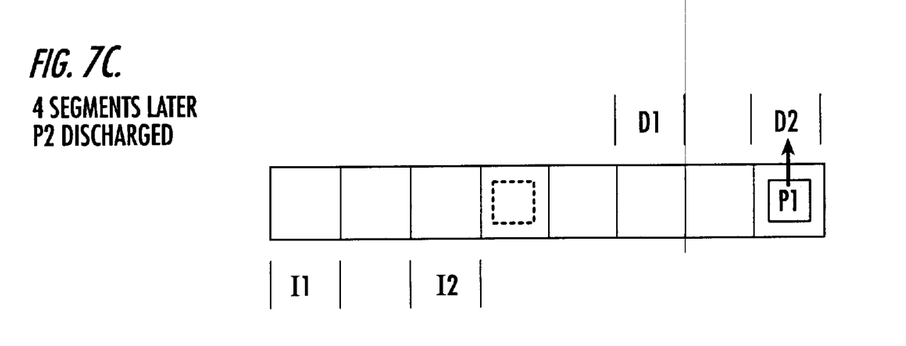

Second Scenario (FIGS. 7A–7C)

Under Scenario 2, the two parcels P1, P2, are input at station I1, I2, as before. However, this time parcel P1 is discharged at station D2. Under this scenario both parcels go though two consecutive idle stations until P2 is discharged at D1. Parcel P1 then goes through three consecutive idle stations until it is discharged at D2.

Under this scenario, conveyor speed does change, at a time between the discharge of parcel P2 and the discharge of parcel P1. This is because the assumption is met that the conveyor must to through a period when all of its parcels idle through at least three consecutive segments at the same time. Another way of describing this is that all parcels on the conveyor must go through at least three consecutive idle stations at the same time. As noted above, parcel P2 only idles though two space segments between its discharge and its discharge. Parcel P1 idles through six segments between its input and discharge, but this idling period is broken up by the discharge of Parcel P2, as shown in FIG. 7B. However, after Parcel P2 is discharged, Parcels P1 is the only parcel on the conveyor, and thus is "all" of the parcels on the conveyor. Thus since at that point Parcel P1 idles through three segments after Parcel P2 is discharged, "all" of the parcels idle through at least three segments at the same time, and thus the threshold is just met. This causes the conveyor to speed up during this idling time.

It should be understood that the idle stations as defined above are conceptualized in terms of distance along the conveying path, namely whether all packages are conveyed along a conveying path for a given distance in an "idling" mode (no discharge or input). However, such stations could also be conceptualized in terms of time, namely whether all packages are conveyed along a conveying path for a given time in an "idling" mode. Since the processing controller is assumed to "know" the location of all of the parcels on the conveyor, the distinction between time and space is somewhat academic, because knowing one results in the knowledge of the other.

Figure 8A:
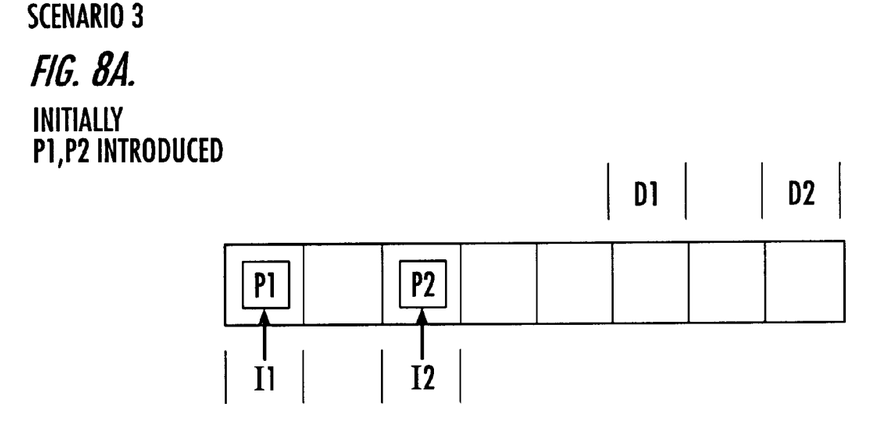
FIGS. 8A–8B are sequential illustrative views of parcels being conveyed under a third conveying scenario.
Figure 8B:
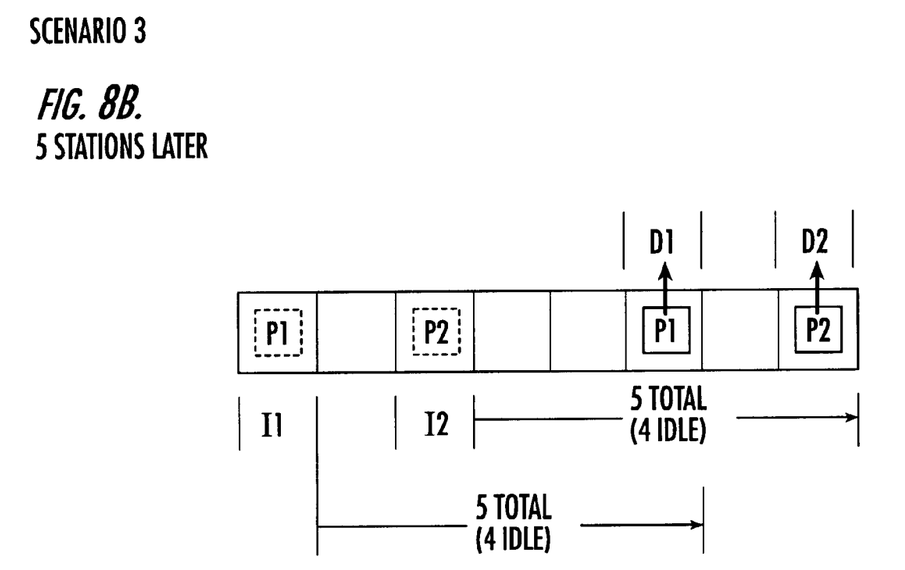

Third Scenario (FIGS. 8A and 8B)

Under scenario 3, as shown in FIG. 8A, the parcels P1 and P2 are simultaneously placed on the conveyor at locations I1 and I2, but this time P1 is discharged at D1 and D2 is discharged at D2. Therefore, both of the parcel go through five idling stations at idle at the same time until being commonly discharged as shown in FIG. 8B. As such, they can be conveyed at a higher speed through said stations until the conveyor is slowed down when they both need to be commonly discharged. Therefore the threshold is met and in fact surpassed. This causes the conveyor to speed up during this idling time.

Figure 9A:
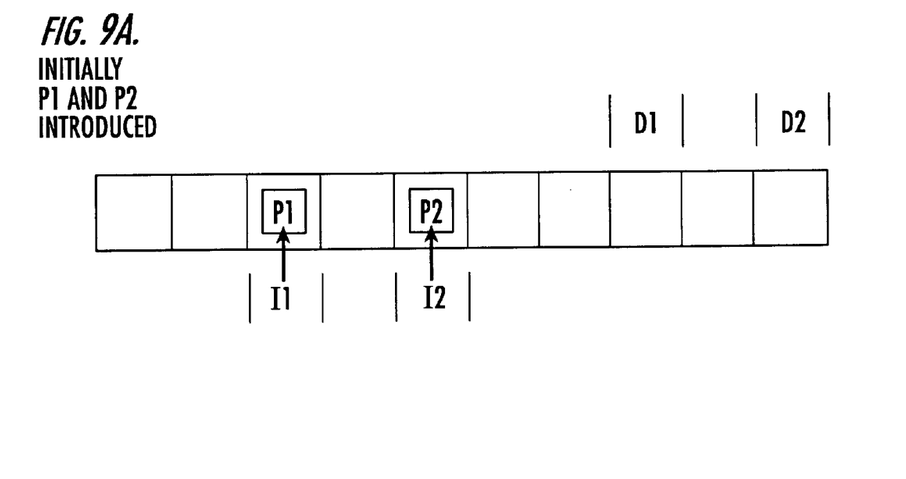
FIGS. 9A–9C are sequential illustrative views of parcels being conveyed under a fourth conveying scenario.
Figure 9B:
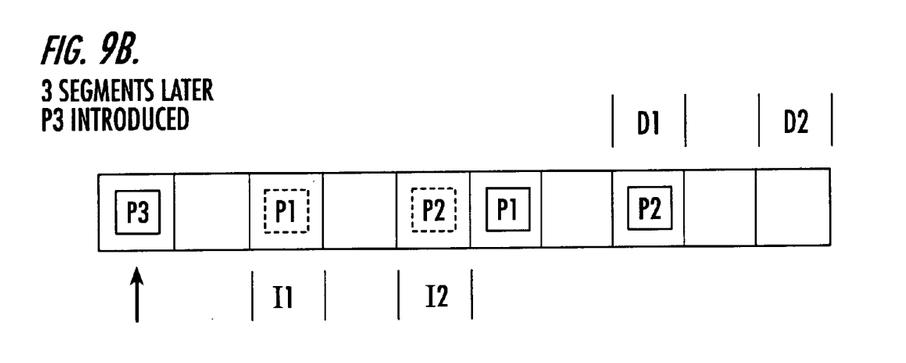
Figure 9C:
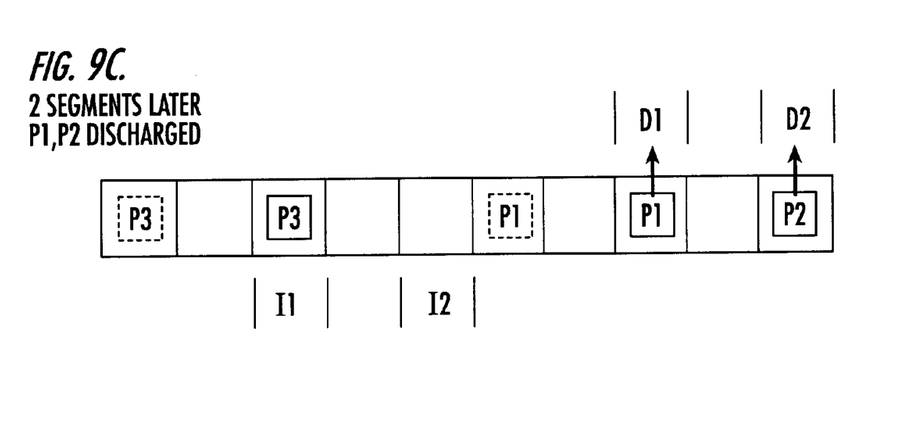

Fourth Scenario (FIGS. 9A–9B)

Under Scenario 4, the sortation is similar to that of Scenario 3, except that a parcel P0 is known to be introduced at I0 after parcels P1 and P2 have gone through two stations at idle. Under this scenario, the computer will recognize that the conveyor will not have more than three adjacent idle stations and no high speed conveying will be conducted.

Variations on Speed

It should be understood that under the embodiments of the present invention described above, the conveyor will consider input to break the idle mode. Under another embodiment, the computer will consider input not to break the idle mode. Such a configuration may be particularly applicable in the situation when a inputting conveyor of conveyor set is used which readily accelerates parcels onto the leading edge of a belt conveyor.

In another embodiment of the present invention, the conveyor is capable of being operated at three speeds, one "low" speed for loading, an "intermediate" speed high than the low speed but slow enough to suitably handle input, and a high speed suitable for delivering the parcels at idle.

The Motor

The drive motor will either have two or more speeds or controlled by an inverter capable of controlling its speed.

Control

As noted above, the speed of the conveyor can be varied by use of a variable speed drive motor, which can be an electric, pneumatic, or other type as known in the art.

Figure 10:
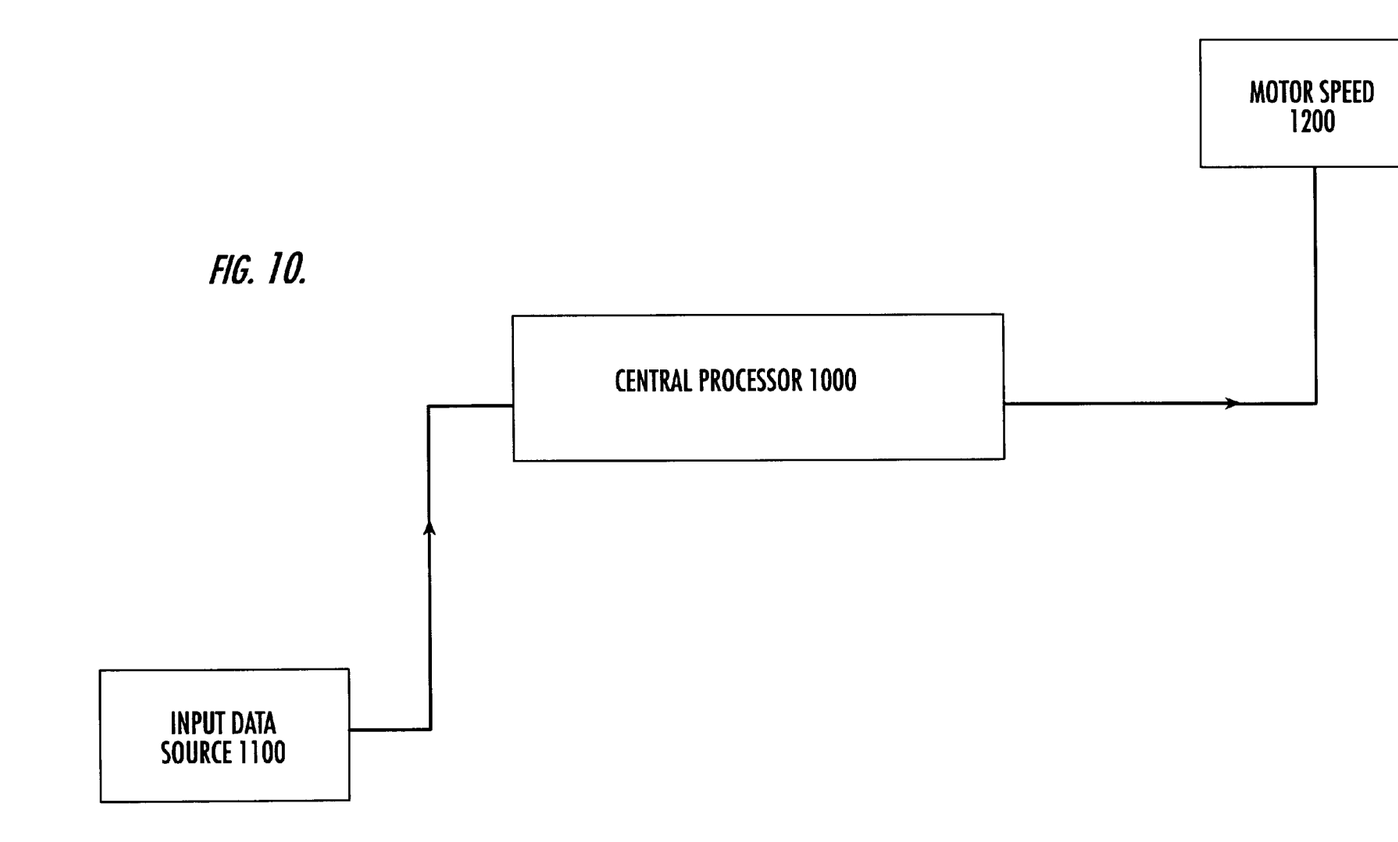
FIG. 10 is an illustrative control diagram which illustrates the interaction of a typical Processor 1000 according to the present invention, which accepts data from a Data Input Source 1100, and controls the speed of a Conveyor Drive Motor 1200 according to the present invention.

FIG. 10 is an illustrative control diagram which illustrates the interaction of a typical Processor 1000 according to the present invention, which accepts data from a Data Input Source 1100, and controls the speed of a Conveyor Drive Motor 1200 according to the present invention.

The Data Input Source 1100 provides information to the Processor 1000 regarding when the next parcel will be entering the conveyor, so that if needed the Conveyor Drive Motor 1200 can be slowed down to accommodate same.

Therefore the Processor 1000 could be thought of as tracking all packages on the system and "knows" the relative destination discharge chute of every single package. The computer could be programmed to switch the motor to double its normal speed when the time elapsed before the next discharge time, which could be for example five (5) seconds at the given speed, at which time the motor will revert to its normal discharge speed. This can be readily converted to distance since conveyor speed is known.

The Input and Discharge Stations

It should be understood that the input stations such as 10, in FIG. 1 can be belt conveyors, push members, or other means known in the art. The discharge stations such as 30 can likewise be provided by belt conveyors, push members, or other means known in the art.

Results

The results might be that over a given time (such as an hour) the system would have run a total of, for example, ten (10) minutes at say double or triple its normal speed. Therefore the average speed of the system can be computed as:

$$300+(600/6)=400 \text{ FPM}$$

or $$300+(900/6)=450 \text{ FPM}$$

The extra speed could conceivably reach a magnitude of 25% which means that the parcels will reach their destination that much sooner for loading or further processing. All that can be done without actually discharging parcels at a higher speed and risking the parcel to overshoot its destination bin.

This method will derive high benefit during "wrap-up" time when the flow on the system is light and the time before system shutdown is short.

Since all such systems have a commercial application and the laws of physics are immutable, even a small advantage in capacity/speed may represent a significant advantage from a return on investment point of view.

Since the method is totally automatic it requires no intervention from an operator at all.

Conclusion

Therefore it may be seen that the present invention overcomes deficiencies in the art by providing an improved conveying method and apparatus which includes variable speed control for transporting packages between loading and unloading stations at varying rates of speed. Although the system must run relatively slowly to discharge packages, packages may be loaded at higher rates of speed. If no discharging is in progress, the system may speed up significantly above its normal speed until time for discharging a package. Since the sorting system knows the distance and time until the next package is unloaded, the conveyor may speed up if the smallest time interval before discharge is within a predetermined window of time. Upon approaching the designated unloading station, the conveyor will resort to its normal speed for discharging the package.

While this invention has been described in specific detail with reference to the disclosed embodiments, it will be understood that many variations and modifications may be effected within the spirit and scope of the invention as described in the appended claims.

What is claimed is:

1. A method of transporting a plurality of parcels from an origination point to either of two different destination points, said transporting being done atop a common conveyor having a speed control, said method including the following steps:
  A) operating said conveyor at a first, substantially constant, speed;
  B) introducing said plurality of parcels onto said conveyor, each of said parcels known to be destined for one of said two different destination points;
  C) determination of the time until the next package of said plurality of parcels would be discharged from said conveyor if said first conveyor speed is used, said determination establishing a remaining idle conveying time;
  D) comparison of said remaining idle conveying time to a predetermined threshold;
  E) responsive to a determination that said remaining idle conveying time is greater than said predetermined threshold, increasing said conveyor transport speed to a second speed higher than said first speed during a portion of said remaining conveying time during which no parcels are discharged, and subsequently decreasing said conveyor transport speed to said first speed by the time the parcel is discharged from the conveyor; and
  F) responsive to a determination that said remaining idle conveying time is less than said predetermined threshold, maintaining said conveyor transport speed at said first speed during said remaining idle conveying time up to and including the time the parcel is discharged from the conveyor.

2. The method as claimed in claim 1, wherein the determination of said remaining idle conveying time in Step "E"

also includes determination of the time until the next package is to be input to said conveyor, such that the determination of said remaining idle time is made by determining the next time the conveyor either accepts a new parcel or discharges a current parcel.

3. The method as claimed in claim 2, wherein in step "E", said increase in said conveyor transport speed is a doubling of speed.

4. The method as claimed in claim 1, wherein in step "E", said increase in said conveyor transport speed is a doubling of speed.

5. The method as claimed in claim 4, wherein the determination of said remaining idle conveying distance in step "E" also includes determination of the distance the conveyor would travel at the first speed until the next package is to be input to said conveyor, such that the determination of said remaining idle distance is made by determining the distance the conveyor would travel at the first speed until the conveyor either accepts a new parcel or discharges a current parcel.

6. The method as claimed in claim 4, wherein in step "C", said increase in said conveyor transport speed is a doubling of speed.

7. The method as claimed in claim 6, wherein in step "D", said increase in said conveyor transport speed is a doubling of speed.

8. An apparatus for transporting a plurality of parcels from an origination point to either of two different destination points, said transporting being done atop a common conveyor having a speed control capable of operating said conveyor at a first, substantially constant, speed, and also capable of operating said conveyor at a second speed higher than said first speed, said apparatus comprising:
   A) a device for introducing a plurality of parcels on said conveyor while said conveyor is operating at said first speed and for discharging said parcels to either of said two different destination points;
   B) a device for determining the time until the next package would be discharged from said conveyor to one of said two destination points if said conveyor remained at said first speed, said determination establishing a remaining conveying time;
   C) a device for comparison of said remaining conveying time to a predetermined threshold; and
   D) a device for determining if said remaining idle conveying time is greater than said predetermined threshold, and if so for increasing said conveyor transport speed during a portion of said remaining conveying time during which no parcels are discharged, and if not for maintaining said conveyor transport speed at said first, relatively constant, speed until said next parcel is discharged.

9. The apparatus of claim 8, wherein said conveyor is a tilt tray conveyor.

10. The apparatus of claim 8, wherein said conveyor is a belt conveyor.

11. The apparatus of claim 8, further comprising an input conveyor configured to accept parcels in a randomly timed manner.

12. The apparatus of claim 8, wherein said device in elements A, B, and C comprises a controller.

13. The apparatus of claim 12, wherein said conveyor is a tilt tray conveyor.

14. The apparatus of claim 12, wherein said conveyor is a belt conveyor.

15. The apparatus of claim 12, further comprising an input conveyor configured to accept parcels in a randomly timed manner.

16. A method of transporting a plurality of parcels from an origination point to either of two different destination points, said transporting being done atop a common conveyor having a speed control, said method including the following steps:
   A) operating said conveyor at a first, substantially constant, speed;
   B) introducing said plurality of parcels onto said conveyor, each of said parcels known to be destined for one of said two different destination points;
   C) determination of the distance until the next package of said plurality of parcels is to be discharged from said conveyor at either of said two different destination points, said determination establishing a remaining idle conveying distance;
   D) comparison of said remaining idle conveying distance to a predetermined threshold;
   E) responsive to a determination that said remaining idle conveying distance is greater than said predetermined threshold, increasing said conveyor transport speed to a second speed higher than said first speed during a portion of said remaining idle conveying distance during which no parcels are discharged, and subsequently decreasing said conveyor transport speed to said first speed by the time the parcel is discharged from the conveyor such that said parcel is discharged at said first speed; and
   F) responsive to a determination that said remaining idle conveying distance is less than said predetermined threshold, maintaining said conveyor transport speed at said first speed through said remaining idle conveying distance up to and including the point at which the parcel is discharged from the conveyor.

17. The method as claimed in claim 16, wherein in step "C", said increase in said conveyor transport speed is a doubling of speed.

18. A method of transporting a plurality of parcels from an origination point to either of two different destination points, said transporting being done atop a common conveyor having a speed control, said method including the following steps:
   A) operating said conveyor at a first, substantially constant speed;
   B) introducing said plurality of parcels onto said conveyor such that at least one of said parcels will be discharged at each of said two different destination points, with an accommodation also being made for future incoming parcels to be input on said conveyor;
   C) determination of the next continuous time period all parcels on said conveyor would be in idle mode, namely a mode in which no parcels are being input to or discharged from said conveyor to either of said two destination points, assuming said conveyor continued at said first speed;
   D) determination of the length in time of said idle mode continuous time period, assuming said conveyor continued at said first speed;
   E) comparison of said idle mode continuous time period to a predetermined threshold;
   F) responsive to a determination that said idle mode continuous time period is greater than said predetermined threshold, increasing said conveyor transport speed to a second speed higher than said first speed during a portion of said idle mode continuous time period during which no parcels are discharged, and subsequently decreasing said conveyor transport speed to said first speed by the time the parcel is discharged from the conveyor; and G) responsive to a determination that said idle mode continuous time period is less than said predetermined threshold, maintaining said conveyor transport speed at said first speed during said remaining idle mode continuous time period and up to and including the time the parcel is discharged from the conveyor.

19. The method as claimed in claim 18, wherein in step "F", said increase in said conveyor transport speed is a doubling of speed.

20. A method of transporting a plurality of parcels from one destination from another atop a conveyor having a speed control, said method including the following steps:

A) operating said conveyor at a first, substantially constant, speed;

B) introducing said plurality of parcels onto said conveyor such that at least one of said parcels will be discharged at each of said two different destination points, with an accommodation also being made for future incoming parcels to be input on said conveyor;

C) determination of the next continuous conveying distance all parcels on said conveyor will be in idle mode, namely a mode in which no parcels are being input to said conveyor or discharged to either of said two destination points;

D) determination of the length of said continuous idle mode conveying distance;

E) comparison of said length of said continuous idle mode conveying distance to a predetermined threshold;

F) responsive to a determination that said continuous idle mode conveying distance is greater than said predetermined threshold, increasing said conveyor transport speed to a second speed higher than said first speed during a portion of said continuous idle mode conveying distance during which no parcels are discharged, but subsequently decreasing said conveyor transport speed to said first speed by the time the parcel is discharged from the conveyor; and G) responsive to a determination that said continuous idle mode conveying distance is less than said predetermined threshold, maintaining said conveyor transport speed at said first speed during said remaining continuous idle mode conveying distance and up to and including the time the parcel is discharged from the conveyor.

21. A method of transporting a plurality of parcels from an origination point to either of two different destination points, said transporting being done atop a common carousel-type conveyor having a speed control, said method including the following steps:

A) operating said carousel conveyor at a first, substantially constant, speed;

B) introducing said plurality of parcels onto said conveyor, each of said parcels known to be destined for one of said two different destination points;

C) determination of the time until the next package of said plurality of parcels would be discharged from said conveyor if said first conveyor speed is used, said determination establishing a remaining idle conveying time;

D) comparison of said remaining idle conveying time to a predetermined threshold;

E) responsive to a determination that said remaining idle conveying time is greater than said predetermined threshold, increasing said conveyor transport speed to a second speed higher than said first speed during a portion of said remaining conveying time during which no parcels are discharged, and subsequently decreasing said conveyor transport speed to said first speed by the time the parcel is discharged from the conveyor; and F) responsive to a determination that said remaining idle conveying time is less than said predetermined threshold, maintaining said conveyor transport speed at said first speed during said remaining idle conveying time up to and including the time the parcel is discharged from the conveyor.

22. A method of transporting a plurality of parcels from an origination point to either of two different destination points, said transporting being done atop a common carousel conveyor having a speed control, said method including the following steps:

A) operating said carousel conveyor at a first, substantially constant, speed;

B) introducing said plurality of parcels onto said conveyor, each of said parcels known to be destined for one of said two different destination points;

C) determination of the distance until the next package of said plurality of parcels is to be discharged from said conveyor at either of said two different destination points, said determination establishing a remaining idle conveying distance;

D) comparison of said remaining idle conveying distance to a predetermined threshold;

E) responsive to a determination that said remaining idle conveying distance is greater than said predetermined threshold, increasing said conveyor transport speed to a second speed higher than said first speed during a portion of said remaining idle conveying distance during which no parcels are discharged, and subsequently decreasing said conveyor transport speed to said first speed by the time the parcel is discharged from the conveyor such that said parcel is discharged at said first speed; and F) responsive to a determination that said remaining idle conveying distance is less than said predetermined threshold, maintaining said conveyor transport speed at said first speed through said remaining idle conveying distance up to and including the point at which the parcel is discharged from the conveyor.

* * * * *

UNITED STATES PATENT AND TRADEMARK OFFICE
CERTIFICATE OF CORRECTION

PATENT NO. : 6,292,710 B1
DATED : September 18, 2001
INVENTOR(S) : Bonnet It is certified that error appears in the above-identified patent and that said Letters Patent is hereby corrected as shown below:

Title page,
Item [56], References Cited, U.S. PATENT DOCUMENTS,
Line 3, "McComble et al." should read -- McCombie et al. --.

Drawings,
Sheet 7, Fig. 7B & Fig. 7C should be deleted and substituted with the following:

-- *FIG. 7B.*
3 SEGMENTS LATER
P2 DISCHARGED

*FIG. 7C.*
4 SEGMENTS LATER
P1 DISCHARGED

--.

UNITED STATES PATENT AND TRADEMARK OFFICE
CERTIFICATE OF CORRECTION

PATENT NO. : 6,292,710 B1
DATED : September 18, 2001
INVENTOR(S) : Bonnet

It is certified that error appears in the above-identified patent and that said Letters Patent is hereby corrected as shown below:

Column 8,
Line 67, "Step" should read -- step --.

Column 10,
Line 44, before "speed" insert a comma (,).

Signed and Sealed this

Sixteenth Day of April, 2002

Attest:

JAMES E. ROGAN
Attesting Officer    Director of the United States Patent and Trademark Office